June 1, 1937.  G. L. BROWN  2,082,679
COMBINED HAND AND AUTOMATICALLY CONTROLLED TRANSMISSION
Filed Aug. 28, 1935  7 Sheets-Sheet 1
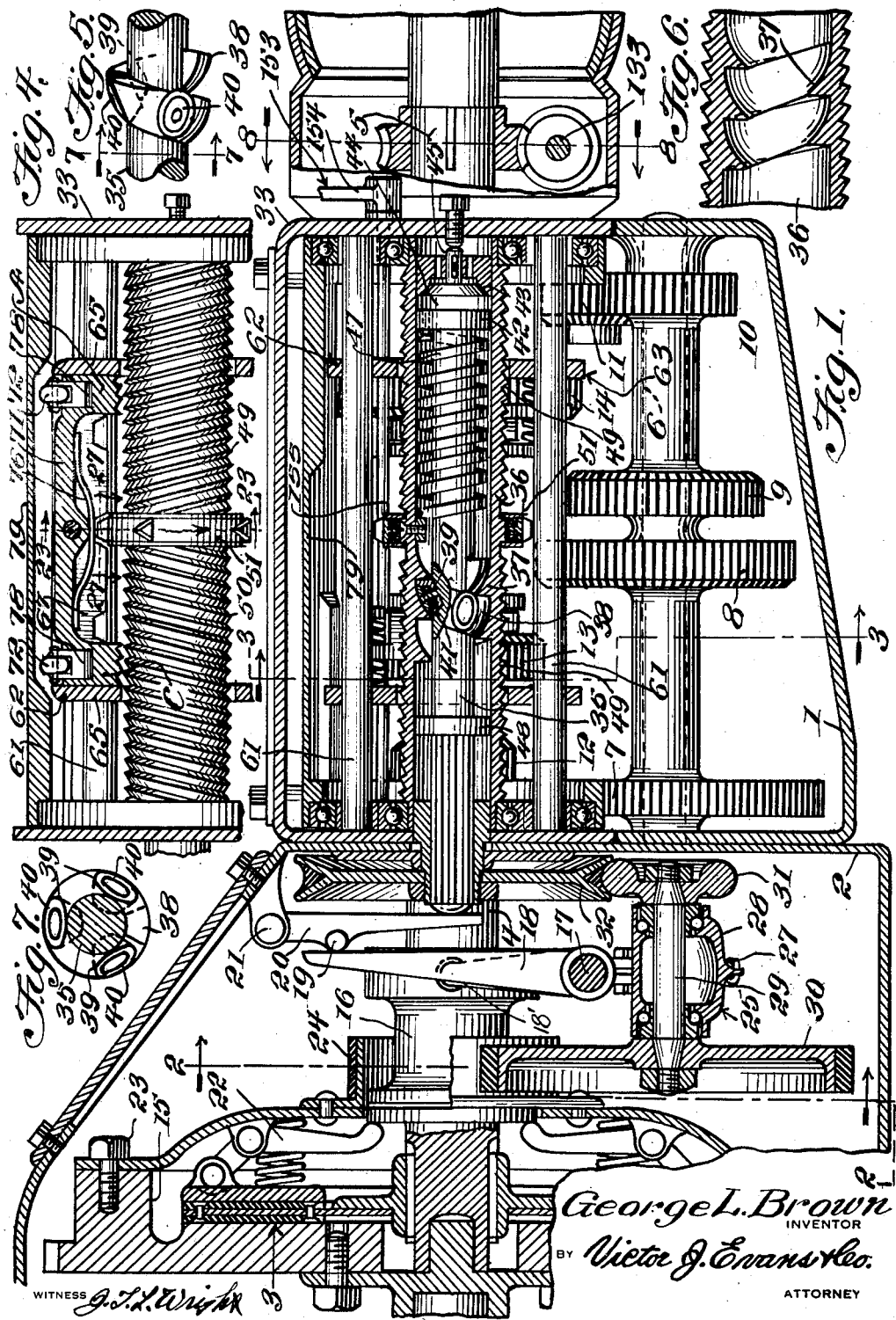
George L. Brown
INVENTOR
BY Victor J. Evans &Co.
ATTORNEY

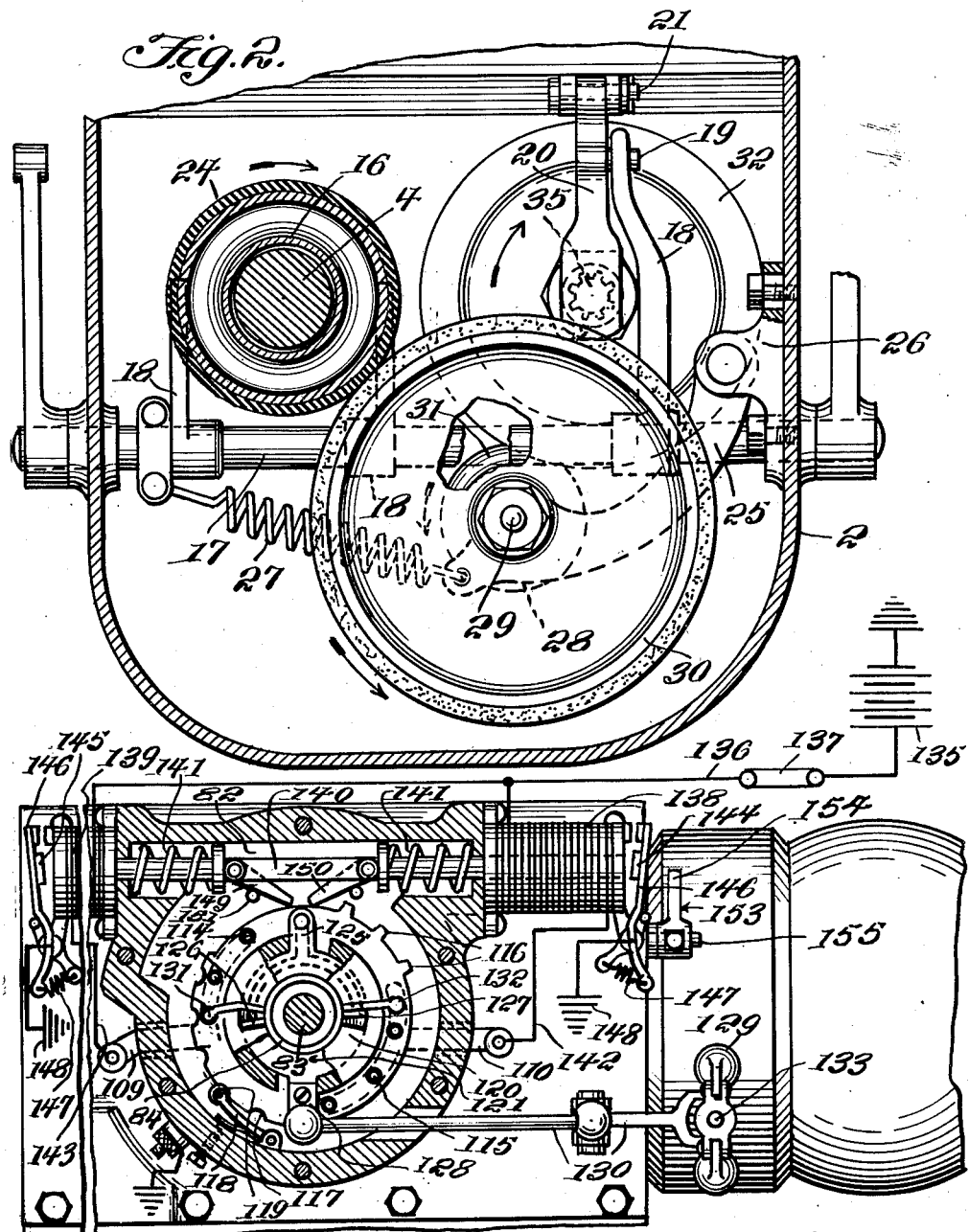

June 1, 1937.  G. L. BROWN  2,082,679
COMBINED HAND AND AUTOMATICALLY CONTROLLED TRANSMISSION
Filed Aug. 28, 1935  7 Sheets-Sheet 3
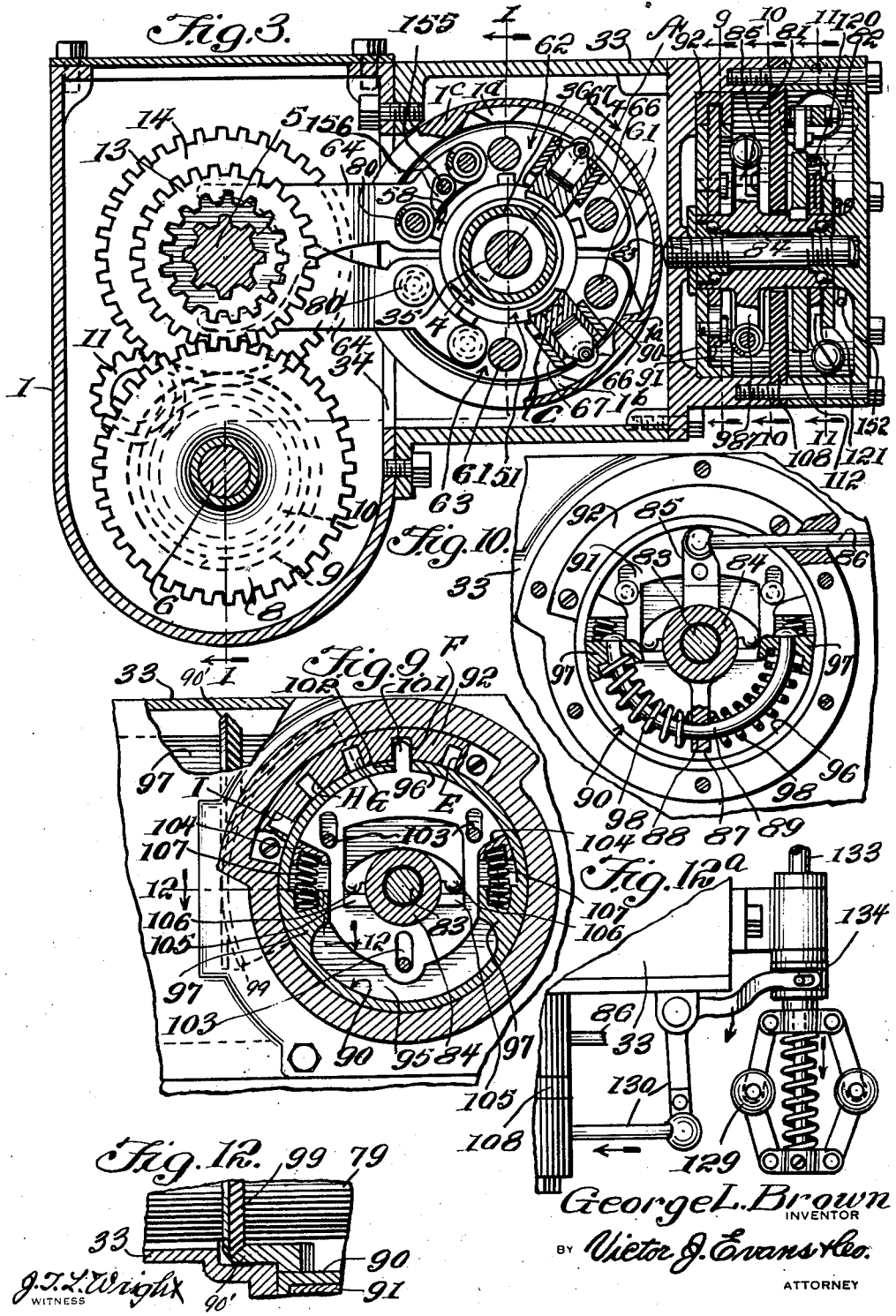
George L. Brown
INVENTOR
BY Victor J. Evans & Co.
ATTORNEY June 1, 1937.  G. L. BROWN  2,082,679
COMBINED HAND AND AUTOMATICALLY CONTROLLED TRANSMISSION
Filed Aug. 28, 1935   7 Sheets-Sheet 4
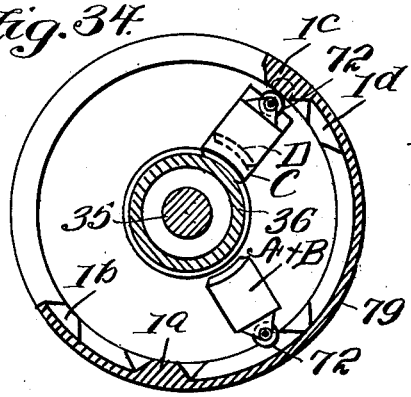
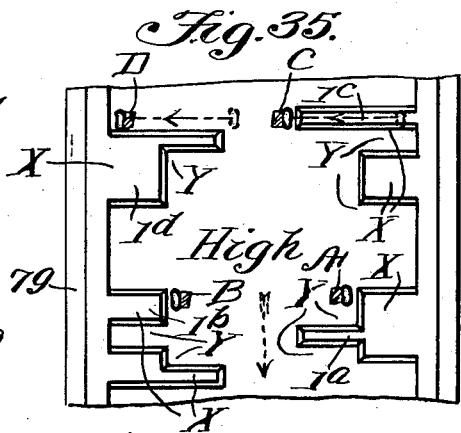
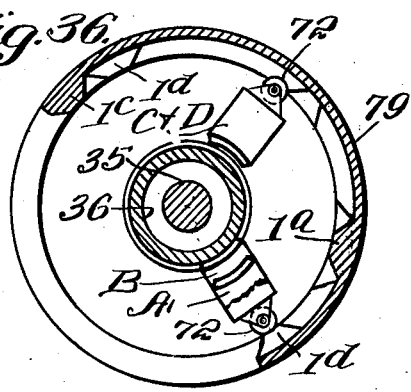
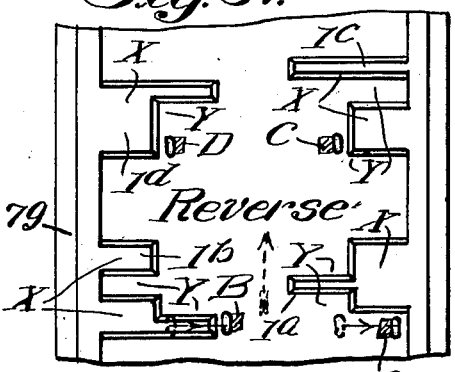
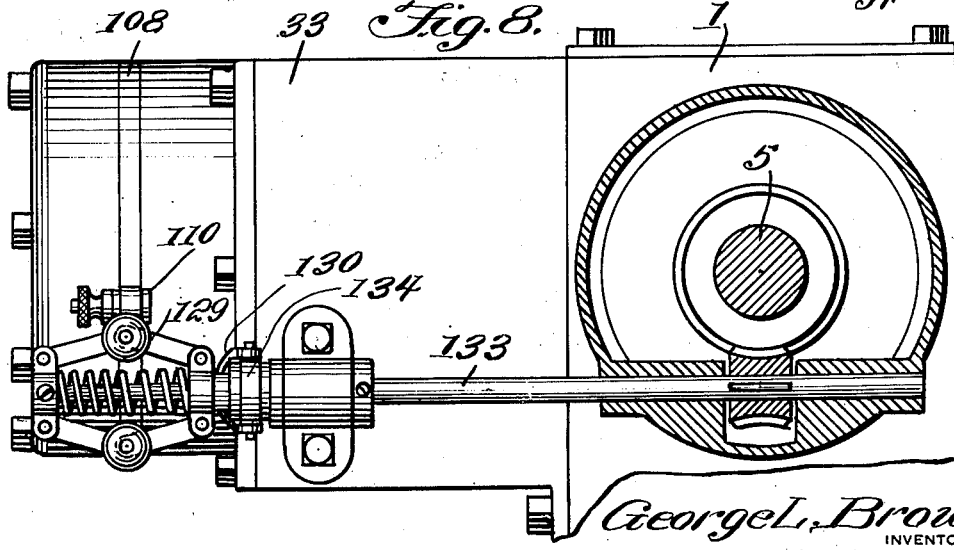
George L. Brown
INVENTOR
BY Victor J. Evans & Co.
ATTORNEY
WITNESS

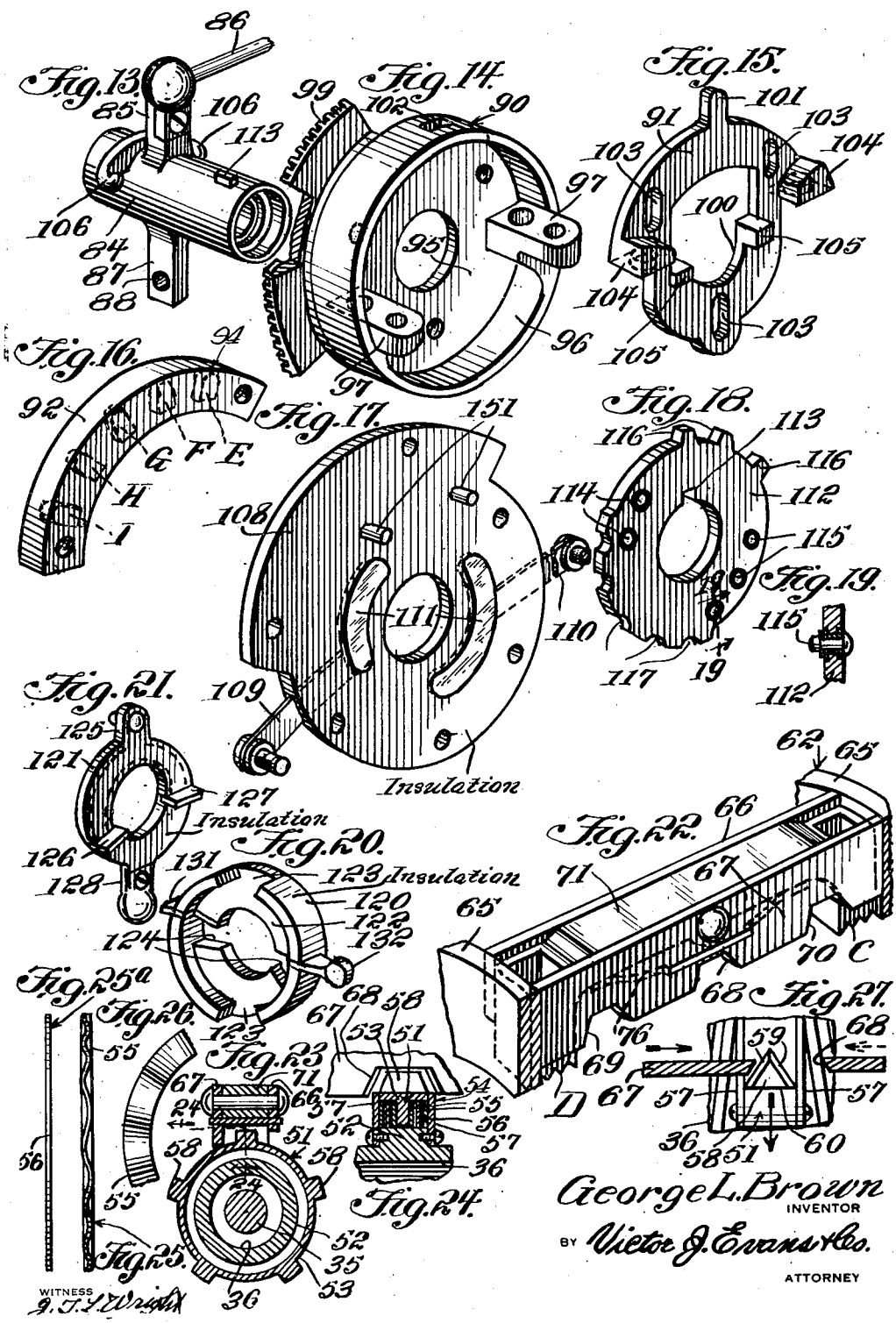
June 1, 1937. G. L. BROWN 2,082,679
COMBINED HAND AND AUTOMATICALLY CONTROLLED TRANSMISSION
Filed Aug. 28, 1935 7 Sheets-Sheet 5

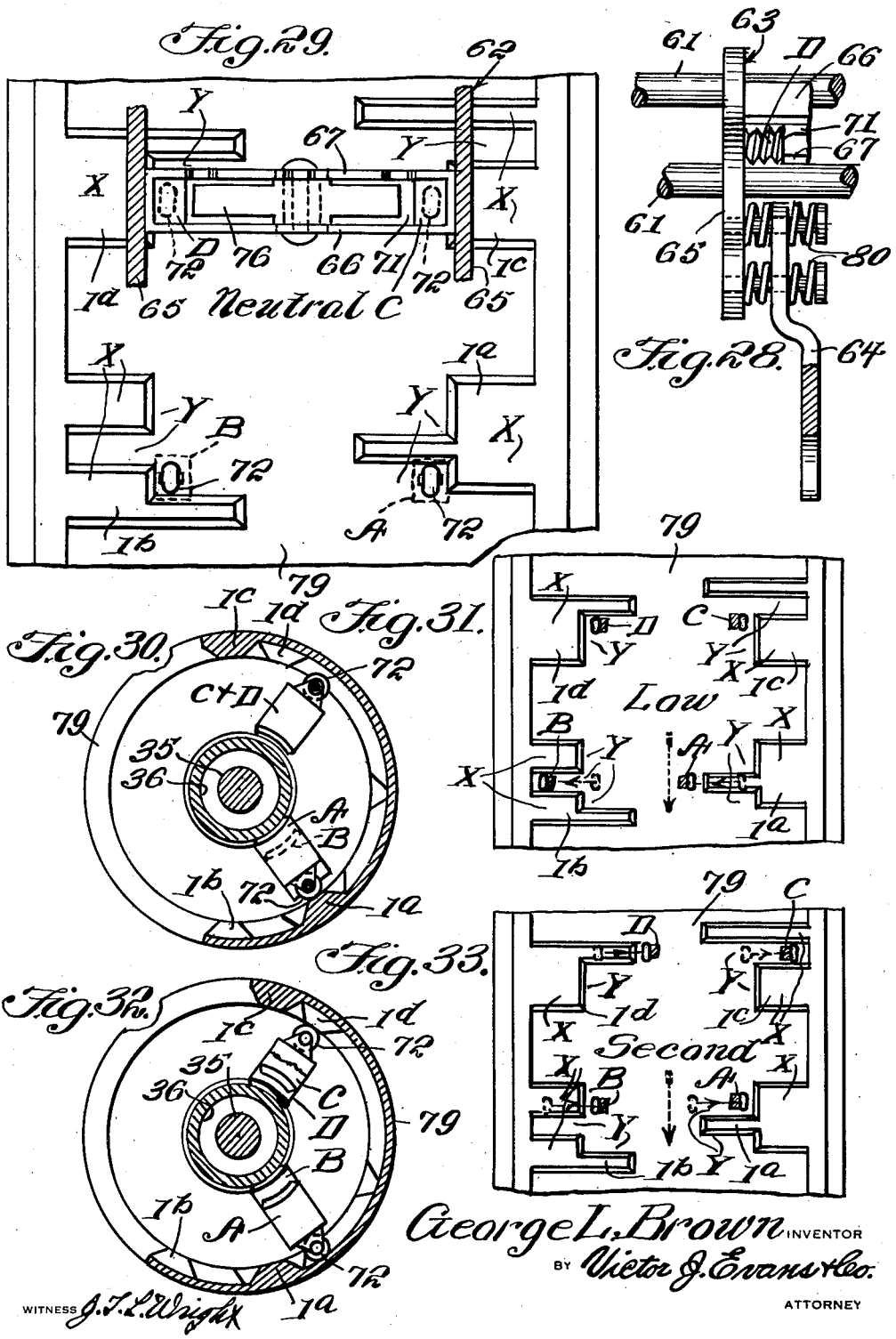

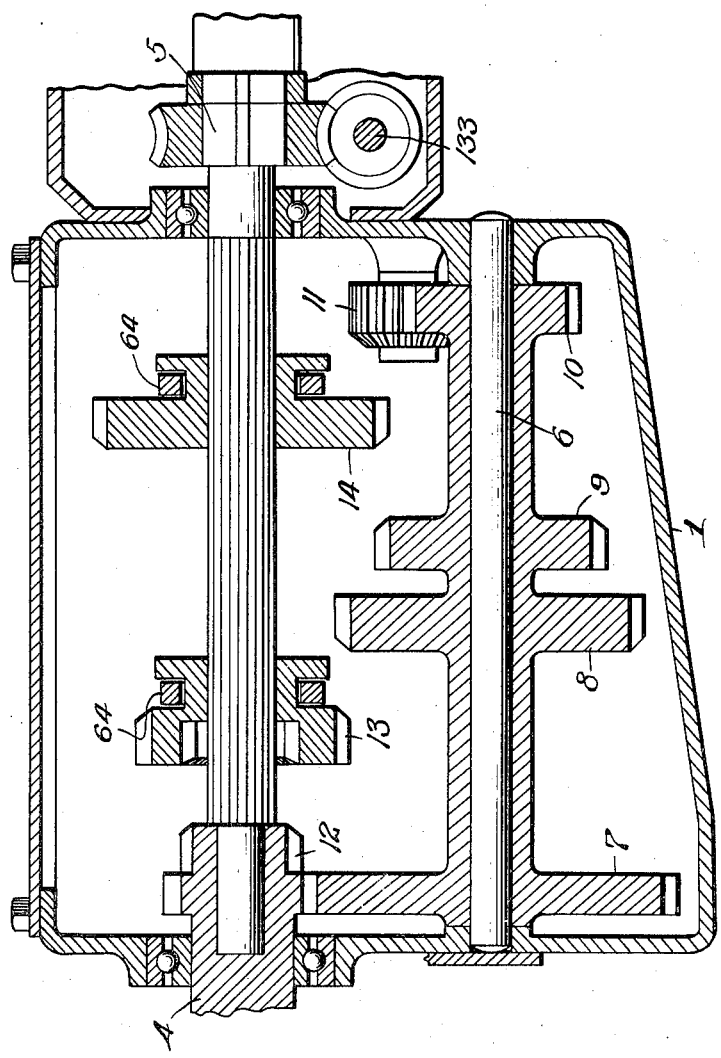

Patented June 1, 1937

2,082,679

UNITED STATES PATENT OFFICE 2,082,679

COMBINED HAND AND AUTOMATICALLY CONTROLLED TRANSMISSION

George L. Brown, Clearwater, Fla.

Application August 28, 1935, Serial No. 38,292

25 Claims. (Cl. 74—336.5)

This invention relates to combined hand and automatically controlled transmissions for motor vehicles of the character set forth in my copending application filed April 23, 1935 and Serial No. 17,864, and has for the primary object the provision of an improved means for selectively shifting the speed changing gears of a transmission and to disengage and engage the clutch of the motor vehicle during the shifting of said speed changing gears.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a vertical sectional view illustrating a motor vehicle transmission and clutch of a motor vehicle equipped with my invention.

Figure 2 is a transverse sectional view taken on the line 2—2 of Figure 1.

Figure 3 is a transverse sectional view taken on the line 3—3 of Figure 1.

Figure 4 is a fragmentary sectional view taken on the line 4—4 of Figure 3.

Figure 5 is a fragmentary side elevation showing the worm of a clutch throw-out shaft.

Figure 6 is a fragmentary sectional view showing a feed nut having a worm thread to match the worm of the clutch throw-out shaft.

Figure 7 is a sectional view taken on the line 7—7 of Figure 5.

Figure 8 is a transverse sectional view taken on the line 8—8 of Figure 1.

Figure 9 is a sectional view taken on the line 9—9 of Figure 3.

Figure 10 is a sectional view taken on the line 10—10 of Figure 3.

Figure 11 is a sectional view taken on the line 11—11 of Figure 3.

Figure 12 is a sectional view taken on the line 12—12 of Figure 9.

Figure 12a is a fragmentary plan view showing a governor control.

Figure 13 is a perspective view showing a control hub.

Figure 14 is a perspective view showing one of the elements of a latch mechanism between the control hub and a control shell of the gear shifting means.

Figure 15 is a perspective view showing a second element of the latch means.

Figure 16 is a perspective view showing a third element of the latch means.

Figure 17 is a perspective view showing a non-movable contact means.

Figure 18 is a perspective view of a movable contact means movable with the control hub.

Figure 19 is a detail sectional view taken on the line 19—19 of Figure 18.

Figure 20 is a perspective view showing a third contact element operating in conjunction with the contact element shown in Figure 18.

Figure 21 is a perspective view showing a fourth contact element actuated by the governor and operating in connection with the contact elements shown in Figures 20 and 18.

Figure 22 is a fragmentary perspective view, partly in section, showing one of the carriages operating in connection with the control shell.

Figure 23 is a sectional view taken on the line 23—23 of Figure 4.

Figure 24 is a sectional view taken on the line 24—24 of Figure 23.

Figure 25 is an edge view showing one of the friction rings employed in the construction of the holding wheel shown in Figures 23 and 24.

Figure 25a is an edge view illustrating a companion friction ring employed with the friction ring shown in Figure 25.

Figure 26 is a fragmentary plan view showing the friction ring disclosed by Figure 25.

Figure 27 is a fragmentary sectional view taken on the line 27—27 of Figure 4.

Figure 28 is a fragmentary sectional view showing one end of one of the carriages with a gear finger or fork yieldably connected therewith.

Figure 29 is a diagrammatical view of the inside of the control shell showing the arrangement of cams thereof and showing the association of said cams with the dogs of the carriages of the automatic control.

Figure 30 is a detail transverse sectional view showing the position of the control shell to bring about low gear or speed of the transmission.

Figure 31 is a diagrammatical view showing the association of the cams of the control shell and the dogs in obtaining low speed or gear.

Figure 32 is a view similar to Figure 30 showing the control shell positioned to bring about the second gear or speed of the transmission.

Figure 33 is a view similar to Figure 31 showing the cams and dogs associated to bring about second gear or speed of the transmission.

Figure 34 is a view similar to Figures 30 and 32 showing the control shell positioned to bring about high gear or speed of the transmission.

Figure 35 is a view similar to Figures 31 and 33 showing the association of the dogs and cams to bring about high speed or gear of the transmission.

Figure 36 is a view similar to Figures 30, 32 and 34 showing the control shell positioned to bring about reverse of the transmission.

Figure 37 is a view similar to Figures 31, 33 and 35 illustrating the association of the cams and dogs to bring about reverse of the transmission.

Figure 38 is a fragmentary vertical sectional view illustrating a part of the selective sliding gear transmission to which my invention is adapted.

Referring in detail to the drawings, the numeral 1 indicates a transmission housing, 2 a clutch housing and the housing 1 has mounted therein any conventional type of selective sliding gear transmission, while the housing 2 has located therein a conventional type of clutch, indicated generally by the character 3. The transmission and clutch are employed in a motor vehicle, the clutch 3 being employed for connecting and disconnecting the transmission to the power source of the motor vehicle. The transmission includes the drive and driven shafts 4 and 5 and a counter or a jack shift 6, the latter being geared to the drive shaft 4, as shown at 7. Variable speed gears 8 and 9 are journaled on the jack shaft. Also journaled on the jack shaft is a reversing gear 10 meshing with an idle gear 11 journaled to the housing 1. The gears 8, 9 and 10 are integrally connected so as to rotate in unison and the gear 8 is integrally connected to one of the gears of the gearing 7 employed for connecting the drive shaft to said gears 8, 9 and 10. The gearing 7 also includes in its construction the conventional high gear 12 and is engaged and disengaged by a speed changing gear 13, the latter being splined to the driven shaft 5. Also splined to the driven shaft is a speed changing gear 14. The speed changing gear 13 when in mesh with the high gear 12 provides high speed to the transmission and when in mesh with the gear 8 provides second speed or gear to the transmission. The speed changing gear 14 when in mesh with the gear 9 provides low speed or gear to the transmission. The speed changing gear 14 when in mesh with the idle gear provides reverse to the transmission. When the gears 13 and 14 are in non-mesh with their companion gears, the transmission is in neutral.

The foregoing description in reference to the transmission briefly sets forth a conventional type of selective sliding gear transmission to which my invention is adaptable.

The clutch 3 is of conventional construction, shown associated with the fly wheel 15 of the power source (not shown), of the motor vehicle. The clutch 3 is engaged and disengaged by the sliding movement of a clutch throwout collar 16, the latter being connected to a shaft 17 by a forked finger 18'. The shaft 17 is suitably journaled in the clutch housing 2 and secured to the shaft 17 is a lever 18 which always rides or bears against a projection 19 formed on an actuating lever 20. The lever 20 is pivoted to the clutch housing, as shown at 21, and extends in an opposite direction to the lever 18, the latter engaging with said control lever 20 adjacent the pivot 21 so that when force is applied to the free end of the control lever, the clutch may be disengaged with comparative ease. It is to be understood that the clutch is of the self-engaging type.

A part of the clutch which forms the support for the pivotal clutch fingers 22 is secured to the fly wheel, as shown at 23, and has secured thereto a pulley 24 through which extends the clutch throwout collar 16. The pulley 24 provides a power takeoff means from the power source of the motor vehicle and which is employed to drive my invention and it is to be understood that the pulley is rotating during the running of the power source.

A pulley supporting arm 25 has one end pivoted to a bracket 26 and the latter is adjustably secured to the clutch housing 2. The other end of the arm 25 is connected to a coil spring 27, the latter being suitably mounted in the clutch housing for exerting an upward pull on the non-pivoted end of the arm 25. A journal 28 is carried by the non-pivoted end of the arm 25 and rotatably supports a shaft 29 having secured thereto pulleys 30 and 31. The spring 27 acts to normally maintain the pulley 30 in frictional contact with the power takeoff pulley 24 and also to maintain the pulley 31 in frictional contact with a pulley 32. The pulley 31 has its periphery shaped to conform to a substantially V-shaped periphery provided on the pulley 32. The pulleys 24, 30 and 32 have frictional linings so as to assure against slippage. The bracket 26 being adjustable on the clutch housing will permit adjustment of the pulleys 30 and 31 with respect to the pulleys 24 and 32 should any one of these pulleys wear more than the others. As long as the wear is approximately the same on all pulleys, the spring 27 will maintain the pulleys 30 and 31 in frictional driving contact with the pulleys 24 and 32. The adjustment of the bracket 26 need only be made should wear be more on one pulley than the rest.

An auxiliary housing 33 is removably mounted on the transmission housing 1 and an opening 34 places said housings in communication with each other. A combined power transmitting and clutch throw-out shaft 35 is mounted for rotation and sliding movement and extends from the auxiliary housing into the clutch housing and has the pulley 32 splined thereto. Journaled in the auxiliary housing 33 and surrounding the shaft 35 is a feed nut 36 in the form of a tubular sleeve. Formed in the nut 36 is a worm groove 37 and formed on the shaft 35 is a worm 38. The pitches of the worm groove and the worm match and the worm has a plurality of pockets 39 in which are journaled substantially conical-shaped rollers 40 which protrude into the worm groove and thereby establish a feed connection between the nut and the shaft. Each roller has anti-friction bearing 41 so it will rotate freely. One end of the shaft 35 abuts the control lever 20 adjacent the latter's free end and secured to the opposite end of said shaft is a piston head 42 cooperating with the nut 36 and a valve seat 43 in forming a dash pot chamber 44. An adjustable valve 45 is provided for the valve seat whereby the escape of fluid or air past the valve seat under the action of the piston head may be regulated. This dash pot arrangement is for the purpose of checking the endwise movement of the shaft 35 in one direction, that is, when the shaft is sliding in a direction to permit engagement of the clutch so that said clutch will not engage too rapidly. It is to be understood that the shaft when sliding in an opposite direction brings about a disengagement of the clutch by rocking the levers 20 and 18, and sliding the clutch throwout collar 16. Further, it is to be understood that the shaft 35 besides being journaled, is capable of a limited endwise movement in either direction while the nut is free to rotate in said auxiliary housing but is held against endwise movement. A coil spring 47 surrounds the shaft 35 and has one end connected to the nut and the other end connected to the piston head 42. As the shaft 35 slides in a direction to disengage the clutch, the tension of the spring is increased so that during the engagement of the clutch the spring will aid in sliding the shaft 35 in an opposite direction and when sliding in said last-named direction its final movement will be retarded by the dash pot arrangement, consequently permitting the clutch to engage gradually. Further, it is to be understood that during the sliding of the shaft 35 to disengage the clutch the nut 36 does not slide therewith and as one end of the spring is connected to the nut it will bring about a winding up of the spring and in that way increase the tension of the spring. The shaft 35 has secured thereto a stop flange 48 for limiting the sliding movement of the shaft 35 in the direction to disengage the clutch. The stop flange 48 will abut one of the journals for the shaft.

Formed on and arranged exteriorly of the nut are right and left hand feed threads 49 and 50 and secured to the nut is a stop wheel 51 arranged so that the right hand feed thread 49 will be at one side and the left hand feed thread 50 will be at the opposite side.

The stop wheel includes a hub portion 52 and a peripheral portion 53. The portions 52 and 53 are connected to one another by a slip frictional drive 54 so that when the peripheral portion has more drag than a predetermined amount the hub portion may turn freely of the peripheral portion. The slip frictional drive means 54 includes a pair of annular rings 55 of corrugated formation and an intermediate ring 56 having smooth faces. The rings are assembled between the peripheral portion 53 and the hub portion 52 and are held assembled by plates 57 secured to the hub portion and slidably contacting the peripheral portion. Spaced teeth 58 are formed on the peripheral portion and each is of substantially triangular shape, as shown in Figure 27, presenting tapered or converging faces 59 and a straight holding face 60.

Guide rods 61 are secured to the auxiliary housing and extend longitudinally of the nut 36 and group thereabout. The rods 61 slidably support carriages 62 and 63 each having a gear fork 64 projecting into the transmission housing. The fork 64 of the carriage 62 connects with the speed changing gear 13, while the fork of the carriage 63 connects with the speed changing gear 14. The sliding movement of the carriages is to move the speed changing gears into their different positions. The carriages each include end plates 65 and parallel side plates 66 and 67. The side plate 67 is of a greater width than the width of the side plate 66 and is provided with spaced notches 68, 69 and 70 through which are adapted to pass the teeth 58 of the stop wheel 51. A dog carrying arm 71 is located between the side plates 66 and 67 and is pivoted intermediate its ends to said side plates. The ends of the arms of said carriages are shaped to form seats for cam rollers 72 and also shaped to provide to one carriage toothed dogs A and B and toothed dogs C and D to the other carriage. A leaf spring 76 is secured to the side plates of the carriage adjacent to the pivot of the dog arm and its ends bear against the arm adjacent the dogs thereof for the purpose of positioning the arm in a neutral position or with the dogs thereof out of mesh with the feed threads 49 and 50. When the speed changing gears are out of mesh with their companion gears, the carriages occupy neutral position, as shown in Figure 4, that is, the notches 68 thereof align with the stop wheel 51 so that said stop wheel may rotate freely with the nut. Also the dogs of said carriages are disengaged from their respective feed threads. By the arrangement of the feed threads and the dogs of the carriages, said carriages may be caused to slide in opposite directions depending on which dogs are engaged with the feed threads. The dogs are engaged with the feed threads through a cam controlled mechanism which will be hereinafter more fully described. When the carriages shift in either direction from neutral position shown in Figure 4, the notches 68 are moved out of alignment with the stop wheel 51 so that teeth thereof may contact the side walls 67 of the carriages and thereby resist turning of the stop wheel which is sufficient to place a drag on the nut to bring about feeding of the shaft 35 in an endwise direction to disengage the clutch. During the sliding movement of the carriages and when the speed changing gears connected thereto reach meshing position, the stop wheel is then aligned with either the notches 69 or the notches 70, depending in which direction the carriages are sliding. As soon as the stop wheel 51 is aligned with either the notches 69 or 70 of the carriages the drag on the feed nut is removed and said feed nut is again free to rotate with the shaft 35. It should be understood that the moment the stop wheel becomes free, pressure of the clutch acting against the end of the shaft and the worm 39 and worm groove 37 forces the nut 36 to rotate temporarily at a faster speed than the shaft 35, thereby permitting the shaft to return to its neutral position. The cam controlled mechanism heretofore broadly referred to is such that only one dog of a carriage will be in mesh with a feed thread of the nut at a time so that the cam controlled mechanism may bring about the sliding of either carriage in either direction by first bringing one dog of the carriage in mesh with the right hand feed thread and then bringing the other dog in mesh with the left hand feed thread. In this construction the carriage 62 may be caused to slide to engage the speed changing gear 13 with either the high gear 12 or with the second gear 8 of the transmission. This construction also is capable of causing the carriage 63 to slide the speed changing gear 14 either in mesh with the gear 9 to provide low gear to the transmission or in mesh with the idle gear 11 to provide reverse to the transmission.

The cam rollers are adjustably mounted to the ends of the dog arms 71 by employing suitable shims 78. The cam control mechanism heretofore broadly referred to includes a cylindrical control shell 79 journaled to the housing for oscillatory movement and surrounds the carriages with the cam rollers contacting the inner face thereof. The oscillatory movement is imparted to the control shell in a step by step movement by a combined manual and automatic control which is shown in the drawings and will be hereinafter described in detail.

The dogs A and B operate or alternatingly mesh with the right and left feed threads of the nut and also the dogs C and D alternatingly mesh with the right and left hand feed threads.

Formed upon the inner periphery of the control shell 79 are cams 1a, 1b, 1c, and 1d. The cam 1a operates the dog A, the cam 1b operates the dog B. The operation of the dogs A and B by the cams 1a and 1b brings about sliding movement of the carriage 63 in opposite directions from its neutral position. The operation of the dogs C and D by the cams 1c and 1d brings about sliding movement of the carriage 62 in opposite directions. It is to be understood that when a dog is engaged by its cam it is forced into mesh with its respective feed thread.

The cams of the control shell have high faces X and low faces Y. The arrangement of the cams within the control shell may be clearly seen by having reference to the diagrammatic views 29, 31, 33, 35 and 37. The raised face of the cam 1a, designated by X includes a substantially rectangular shaped portion and an elongated portion with low faces Y at opposite sides of said elongated portion. The cam 1b has two high faces X with a low face Y therebetween, one of the high faces X being of substantially rectangular shape and the other high face X of elongated formation, a portion of which is of decreased width. The cam 1c has two high faces X with a low face Y therebetween. One of the portions of the high face X of the cam 1c is of substantially rectangular shape, while the other portion of the high face is of elongated formation. The cam 1d has a high face including a substantially rectangular shaped portion and an elongated portion with the low face Y located to one side of the elongated portion. The relation of the dogs A, B, C and D to the cams 1a, 1b, 1c and 1d according to the different positions of the control shell 79 is clearly shown in Figures 29 to 37, inclusive. It is to be understood that the dogs through their rollers may readily ride the high and low faces of the cams in accordance with the movement and positions occupied by the control shell 79.

The gear fingers 64 each have a yieldable connection 80 with its respective carriage so that said carriage may have a limited sliding movement prior to imparting sliding movement to the speed changing gear connected to the finger.

The combined manual and automatic control heretofore broadly referred to is located in chambers 81 and 82 forming a part of the auxiliary housing 33. The auxiliary housing is made up of several sections detachably connected together so that the various parts can be readily assembled in said housing. The combined manual and automatic control includes a shaft 83 suitably secured in the auxiliary housing 33 and extending through the chambers 81 and 82 and has journaled thereon a control hub 84 provided with an arm 85 to which is pivotally connected a suitable manual operating means 86. Also formed on the control hub 84 is an arm 87 extending in an opposite direction to the arm 85 and provided with an aperture 88 to slidably receive a semicircular shaped guide rod 89.

Mounted on the control hub 84 is a latch mechanism which consists of an element 90, a second element 91 and associated with the latter is a third element 92 suitably fixed to the auxiliary housing 33 of arcuate shape and provided with relatively spaced notches 94. The number of notches 94 is in accordance with the number of forward speeds, neutral and reverse of the transmission. The notches 94 are lettered E, F, G, H, and I. The notch F is for neutral position of the transmission, the notch E is for reverse position of the transmission, the notch G for first speed or gear of the transmission, H is for second or intermediate speed or gear of the transmission and I is for high or third gear for the transmission.

The element 90 of the latch mechanism includes a disc-like portion 95 having formed integrally therewith an annular flange 96. The disc-like portion 95 is centrally apertured to receive the control hub 84. The element 90 of the latch mechanism may turn free of the control hub and has formed thereon oppositely arranged lugs 97 apertured to receive the guide rod 89, the latter being suitably secured to the lugs 97. Coil springs 98 are mounted on the guide rod at each side of the arm 87 and bear against the lugs 97. The flange 96 abuts the element 92 and the elements 90 and 91 are capable of turning relative to the element 92 when unlatched therefrom. The element 90 has a gear 90' secured thereto and meshes with a segmental gear 99 secured to the control shell 79 whereby the element 90 may operate the control shell 79 in either direction.

The second element 91 of the latch mechanism is in the form of a plate provided with an opening 100 through which the control hub extends. The second element 91 has a lug 101 formed thereon which extends through an opening 102 in the element 90 and is adapted to move into and out of the notches E, F, F, H and I of the third or holding element 92. The second element 91 is slidably secured to the element 90, as shown at 103, and has formed thereon pairs of lugs 104 and 105. The lugs of each pair are oppositely arranged. The lugs 104 overlie the lugs 97 of the element 90 while the lugs 105 are alternatingly engaged by shoulders 106 formed on opposite sides of the control hub. Springs 107 are interposed between the lugs 104 and 97 for the purpose of centering or maintaining the second element in a locking position within the element 92, that is, with the lug 101 extending into one of the notches 94. The control hub and elements 90, 91 and 92 of the latch mechanism go to make up the manual control for moving the control shell in a step by step movement. Figure 9 shows the latch mechanism in neutral position, that is, the various parts are positioned relative to each other to place the transmission in neutral.

A contact disc 108 is mounted in the auxiliary housing 33 and acts to separate the chambers 81 and 82 and is provided with an opening through which the control hub 84 extends. The contact disc 108 is constructed of insulating material and has secured thereto oppositely extending contacts 109 and 110 provided with arcuately curved ends 111 arranged at opposite sides of the opening through which the control hub extends.

A movable contact member 112 is keyed to the control hub 84, as shown at 113, and is constructed of conductive material. Secured to and insulated from the movable contact member are groups of buttons 114 and 115. There are two contact buttons 114 to one group and three contact buttons 115 to the other group. The contact buttons 114 engage with the end 111 of the contact 109 and the contact buttons 115 engage with the end 111 of the contact 110. A group of three relatively spaced holding teeth 116 are formed on the periphery of the contact member 112 and the latter also is provided in the periphery with a group of relatively spaced holding notches 117 and including a notch for each position of the transmission. A spring-pressed retaining arm 118 is pivoted to the auxiliary housing 33 and has a ball-shaped head 119 to ride into and out of the notches 117 for temporarily holding the contact member 112 in its several positions or in accordance with the speed changing positions of the transmission. These notches 117 operating in conjunction with the spring-pressed pivotally mounted arm 118 are for the purpose of permitting the operator to determine by feel, when manually actuating the transmission, the different speed changing positions of the transmission as well as to prevent a retroactive rotation of the contact member 112 by the action of either the springs 98 during the movement of the element 91 or the lug 101 thereof when disengaged temporarily from any of the notches 94.

Third and fourth contact members 120 and 121 are journaled on the hub 84 and are capable of having a limited turning movement relative to each other. The third contact member 120 is in the form of a plate 122 centrally apertured to receive the hub and provided with pairs of oppositely arranged slots 123 and 124. The plate-like portion 122 carries a marginal flange in which fits the fourth contact element 121, the latter being centrally apertured to receive the control hub 84. The element 120 is constructed of insulating material. An extension 125 is formed on the fourth contact member 121 and operates in one of the slots 123 and has electrically connected thereto contacts 126 and 127 operating between the walls of the slots 124. The contacts 126 and 127 are oppositely arranged. An arm 128 is formed on the fourth contact member and extends through one of the slots 123 and is connected to a governor 129 by links and levers 130. Secured to walls of the slots 124 are contacts 131 and 132 to cooperate with the contacts 126 and 127 in alternatingly closing an electric circuit which will be hereinafter more fully described.

The governor 129 is of the ball type, as shown in Figure 12ª of the drawings, and its shaft 133 is suitably geared to the driven shaft of the transmission, while the governor sleeve 134 is connected to the linkage 130. The governor being connected to the fourth contact member will impart thereto an oscillatory movement in accordance with the variance of speed of the motor vehicle to which the transmission is applied. The contact 125 lies against the movable contact member 112; the latter forms an electrical ground to the transmission housing. An electrical source 135 has one terminal thereof grounded to the transmission housing and its other terminal is connected to an electrical conductor 136. This conductor has therein a control switch 137 and is electrically connected to solenoids 138 and 139, the cores of which are in the form of a slidable rod 140. The solenoids are suitably supported in the chamber 82 of the auxiliary housing. Connected to the solenoid rod 140 are coil springs 141 acting in opposition to each other for centering the rod 140 so that it extends an equidistance into each solenoid. The solenoid 138 is electrically connected to the contact 110 by a conductor 142 and the solenoid 139 is electrically connected to the contact 109 by a conductor 143. Armatures 144 and 145 are associated with the ends of the solenoids 138 and 139 and are adapted to be attracted by said solenoids when the latter are energized. Each armature includes a pivotal element 146 connected with a spring 147 to have a snap action. The armatures 144 and 145 are grounded to the transmission housing, as shown at 148 and are so connected within the electric circuit as to effect a secondary or auxiliary electric circuit to the solenoid when attracted thereby, maintaining said auxiliary circuit after the initial circuit through elements 120 and 121 has been broken and until solenoid rod 140 has completed its stroke.

Oppositely extending dogs 149 and 150 are pivoted to the solenoid rod 140 and ride the periphery of the movable contact member 112 and cooperate with the teeth 116 for imparting a step movement to said movable contact member 112. Stops 151 are provided for limiting the pivotal movement of the dogs.

A coil spring 152 is interposed between the auxiliary housing 33 and the third contact member 120 for the purpose of holding the latter in frictional contact with the contact element 112 which allows member 120 to follow the member 112 in the direction of the latter's movement so as to bring contacts 126 and 131 together during an increased speed of the governor, also to bring contacts 127 and 132 together during the decreased speed of the governor.

This effects a grounding of the proper solenoid through buttons 114 in the first instance and through buttons 115 in the second instance. It will be noted that this frictional contact between members 120 and 112 serves an important function. After the initial movement of the member 112, the members 120 and 121 are in continuous contact during increasing speeds of the governor and the contact with the buttons 114 is effected by the governor forcing both members 120 and 121 forward until the same, through the contact 131, touches one of the buttons 114. The reverse movement of the governor brings the element 121 into contact with the contact 132 of the element 120 and this movement effects grounds through buttons 115 to the solenoid 138. It should be further noted that contacts 126 and 131 and contacts 127 and 132 respectively, remain in contact one with the other during the entire time of an increased and of a decreased speed of the governor, respectively. The only exception is when the governor first commences to decrease in speed, the first effect is to shift the element 121 so as to reverse the contact connections above mentioned. This permits the vehicle to reduce in speed considerably before a connection is effected with buttons 115 so as to ground solenoid 138 and shift the gears to obtain lower speeds.

A hand control 153 is provided for effecting disengagement of the clutch 3 without changing the positions of the speed changing gears of the transmission and consists of a control lever 154 secured to a shaft 155 suitably journaled in the auxiliary housing 33 and carries thereon a cam 156 which may be moved into and out of engagement with the stop wheel 51 and when in engagement with the latter will place a drag upon the feed nut 36 and temporarily retain the feed nut against free rotation and thereby bring about endwise movement of the shaft 35 to disengage the clutch. This arrangement is to be employed when it is desired to stop the drive of the power source to the transmission without affecting the location of the speed changing gears. As soon as the cam is disengaged from the stop wheel, the nut is free to rotate and the clutch to engage and return the shaft 35 to its initial position.

In describing the operation of this invention, it is to be understood that reverse and low speeds of the transmission is established manually and if desired, second and high speeds may be established manually. However, second and high speeds may be automatically established by the variable speeds of the motor vehicle to which the transmission is adapted. The automatic feature of this device may be cut out at any time by operating the switch 137. The transmission, as shown in Figure 1, is in neutral with the clutch 3 engaged. To reverse the motor vehicle, the operator actuates the manual control means 86 in a certain direction which turns the control hub 84 in a clockwise direction and one of the shoulders 106 thereof engages one of the lugs 105 of the element 91 of the latch mechanism, causing a sliding movement to said element 91 which disengages the lug 101 from the notch F. During the turning of the control hub 84, one of the springs 98 is compressed by the arm 87 swinging with the control hub 84 so that as soon as the lug 101 is disengaged from the notch F, the element 91 snaps over into a position to bring the lug 101 opposite the notch E. The springs 107 then act to slide the element 91 in a reverse direction to bring the lug 101 into the notch E. During the turning of the element 91, the element 90 is turned therewith by the lug 101 extending through the opening 102 and the element 90 being geared to the control shell 79 moves the latter from neutral position, as shown in Figure 9, to reverse position, as shown in Figures 36 and 37. One of the high faces X of the cam 1b then engages the roller of the dog B of the carriage 63, causing the teeth of said dog ends to mesh with the left hand feed threads of the feed nut 36, the latter being rotated by being driven from the shaft 35 through the worm 40 and the worm groove 37 will cause said carriage to slide endwise and bring the speed changing gear 14 into mesh with the idle gear 11 and thereby establish reverse to the transmission. During this operation, the low faces of the cams 1a, 1c and 1d are disposed over the dogs A, C and D. As the carriage 63 starts to slide to the right in Figure 1 for meshing the speed changing gear 14 with the idle gear 11, the notch 68 of said carriage moves out of the path of rotation of the stop wheel 51 so that a tooth thereof may contact the wall 67 of the carriage, thereby temporarily stopping the rotation of the feed nut and consequently the sliding movement of the carriage. The stopping of the feed nut brings about an endwise sliding movement of the shaft 35 due to the worm 38 and rollers 40 thereof operating in the worm groove 37. As the shaft 35 slides endwise the clutch is disengaged. As the clutch becomes disengaged, the stop shoulder 48 abuts one of the journals for the shaft 35 and stops the sliding movement of said shaft. When the shaft 35 is stopped in sliding movement its rotation continues and the friction clutch between the hub and periphery of the stop wheel permits the hub to turn relative to the periphery, the latter still being held by the carriage so that the nut may again rotate with the shaft 35 to continue the sliding movement of the carriage to bring about meshing of the speed changing gear 14 with the idle gear 11. As soon as the speed changing gear 14 moves into mesh with the idle gear 11 the notch 70 aligns with the stop wheel, freeing the latter for free rotation, thereby permitting the rotation of the feed nut. As the stop wheel becomes free to rotate through the notch 70 and the drag on the nut being thereby released, said nut is then freed and permitted to respond by increased speeds brought about by force of the clutch against the end of the shaft 35 and by the action of the worm 38 and its rollers 40 in the worm groove 37 of said nut. It is to be understood that the force of the clutch acting against the shaft and in connection with the worm and worm groove of said shaft and nut forces said nut to temporarily rotate at a greater speed than the shaft 35, thereby permitting the shaft to return to its neutral position within the nut which permits the clutch to again become engaged. During this last sliding movement of the shaft 35 the dash pot acts on the shaft 35 and retards its sliding movement so that the clutch will engage gradually. The shaft 35 when sliding to disengage the clutch tensions the spring 47 by winding said spring so that during the engagement of the clutch the spring 47 aids the clutch in returning the shaft 35 to its initial position.

A reverse movement of the hand controlled means 86 causes the hub 84 to turn in an anti-clockwise direction. The turning of the hub in an anti-clockwise direction causes the element 91 to slide and move the lug 101 out of the notch E and at the same time compress the other spring 98 so that said element 91 will swing in an opposite direction to align the lug 101 with the notch F and move therein under the influence of the springs 107. During the reverse swinging movement of the element 91, the element 90 is swung therewith to turn the control shell to bring the high faces X of the cam 1a to engage the roller of the dog A and force the latter to mesh with the right hand feed thread 49 of the nut 36, causing a reverse sliding movement of the carriage 63, the purpose of which is to disengage the speed changing gear 14 from the idle gear 11 and restore said speed changing gear 14 to neutral position. During this operation, the carriage 63 slides to the left in Figure 1, and as soon as the notch 70 thereof moves out of the path of rotation of the stop wheel 51, one of the teeth of said stop wheel engages the side plate 67 of the carriage 63 and thereby temporarily stops rotation of the nut and as soon as the nut is stopped, the shaft 35 is caused to slide endwise and disengage the clutch. On the first initial sliding movement of the carriage to the left the gear fork thereof yields relative thereto to permit the speed changing gear 14 to remain in mesh with the idle gear 11 until the clutch is disengaged. As soon as the clutch is disengaged the feed nut again rotates and the carriage proceeds to slide to the left in Figure 1, thereby disengaging the speed changing gear 14 from the idler gear and restoring said speed changing gear 14 to neutral position. As the speed changing gear 14 arrives in neutral position, the notch 68 aligns with the stop wheel and the nut is again free to rotate with the shaft 35 and faster than said shaft 35 due to the pressure of the clutch against the shaft and the action of the worm 38 and its rollers 40 in the worm groove 37 within the nut as heretofore described. It is to be understood that when the speed changing gear 14 has moved fully in mesh with the idler gear 11 or returned to neutral position, the dogs A and B have been disengaged by the high faces of their respective cams thus permitting the spring 76 to restore the dogs to neutral position or disengage from the feed threads of the nut. The foregoing explains how reverse is established to the transmission and to obtain low gear or speed thereto the manual control means 86 is manually moved to turn the hub 84 in an anti-clockwise direction. This brings about operation of the element 91 to move the lug 101 out of the notch F and into the notch G. Said movement of the element 91 imparts movement to the element 90 and the latter in turn imparts movement to the control shell, bringing the high faces X of the cam 1a in engagement with the roller of the dog A causing said dog to mesh with the right hand feed thread 49 of the nut. The feed nut being rotated by the shaft 35 causes the carriage 63 to slide to the left of its neutral position in Figure 1, which causes the speed changing gear 14 to move into mesh with the gear 9 of the transmission and thereby establish low gear to the transmission, it being understood that during the movement of the carriage 63 in the last-named direction, the clutch is disengaged automatically by the shaft 35 and feed nut, the latter being temporarily held against rotation by the stop wheel 51 moving out of alignment with the notch 68 and contacting the side walls 67 of said carriage. As soon as the clutch is disengaged the feed nut again rotates and the carriage continues to slide to the left in Figure 1, bringing about meshing of the speed changing gear 14 with the gear 9 and as the speed changing gear meshes with the gear 9 the notch 69 moves in alignment with the stop wheel, freeing the latter to permit the nut to turn freely with the shaft 35 and temporarily faster than said shaft. Thus it will be seen that reverse and low gears are established by the manipulation of the manual control means 86.

Should it be desired to obtain intermediate or second speed and high speed to the transmission manually, the operator actuates the control means 86 in the same manner as to obtain low gear to the transmission. Each actuation of the manual control means 86 will first bring about the positioning of the control shell, as shown in Figures 32 and 33, to establish second or intermediate gear of the transmission and next position the control shell, as shown in Figures 34 and 35, to establish high gear or speed to the transmission. It is to be understood that the operations reverse and low gear heretofore described are brought about by the carriage 63 while the carriage 62 remains idle or stationary. To obtain second gear or speed to the transmission, the control shell 79 is moved into the position shown in Figures 32 and 33 either by the manually controlled means 86 or by the action of the governor 129 and electric solenoids 138 and 139. The vehicle being in motion, the governor 129 is operated. As the speed of the vehicle increases the governor acts on the parts shown in Figures 13 to 21, inclusive and which is as follows: During the operation of the transmission in low gear the control hub has moved the movable contact member 112 so that one of the teeth 116 thereof lies between the dogs 150 and 149. This positions the contact 131 of the contact member 120 in engagement with contact 126 of contact member 121 and in close proximity to the first button 114 of member 112 so that when the governor increases its speed it moves the contact elements 121 and 120, bringing the contact 131 of the member 120 into engagement with the first contact button 114 of the member 112 thereby completing the electric circuit to the solenoid 139 and as the latter is energized it attracts the armature 145 and closes the auxiliary ground to the electric circuit maintaining the solenoid energized until the circuit is broken by the movement of the solenoid rod 140 against the armature 145. As the solenoid 139 is energized it attracts the solenoid rod 140, contacting the dog 150 with one of the teeth of the member 112, thereby turning the latter in an anti-clockwise direction, sliding the contact button 114 from beneath contact 131, thus breaking the initial or primary circuit to the solenoid 139. The member 112 being attached to the hub 84 acts upon the other members in the control system in the same manner and with the same effect and results as when the control is operated manually. Thus it will be seen that the electric circuit through armature 145 remains closed long enough for the contact member 112 to turn the hub 84 a sufficient distance to bring about disengagement of the lug 101 of the element 91 from the notch G and align it with the notch H. This movement of the element 91 imparts movement to the element 90 and the latter in turn operates the control shell into a position to bring the high face X of the cam 1b to engage the roller of the dog B and force the latter to mesh with the left hand feed thread 50 of the nut causing the carriage 63 to slide to the right in Figure 1 for disengaging the speed changing gear 14 from the gear 9 and restoring said speed changing gear 14 to neutral position. At the same time the high face X of the cam 1d engages the roller of the dog D, causing the latter to mesh with the left hand feed threads 50 of the nut to move the carriage 62 to the right in Figure 1, bringing the speed changing gear 13 into mesh with the gear 8 thereby automatically establishing intermediate or second gear to the transmission. It is to be understood that when the solenoid rod 140 is attracted by the solenoid 139 and moves to the limit of its distance in Figure 1, it abuts the armature 145 and breaks the auxiliary or secondary electric circuit. The contact 131 is now positioned between the pairs of buttons 114 so that as the speed of the vehicle increases in second gear of the transmission, the governor 129 again acts or moves the contact elements 121 and 120 again engaging the second contact button 114 with the contact 131 thereby again completing the circuit to the solenoid 139 for the energization of the latter which brings about closing of the auxiliary ground circuit by attracting the armature 145 so that as the contact button 114 moves from beneath the contact 131, the electric circuit will remain closed until opened by the solenoid rod 140 moving its full distance under the attraction of the solenoid 139. Said movement of the solenoid rod 140 is for turning the contact member 112 and consequently the control hub 84. The turning of the control brings about operation of the latch element 91 to move the lug 101 thereof out of the notch H into the notch I. The latch element 9 assuming the latter-named position has turned therewith the element 90 which in turn has moved the control shell into the position shown in Figures 34 and 35. The control shell when in the latter-named position brings the high face X of the cam 1c in engagement with the roller of the dog C causing the latter to mesh with the left hand feed threads 50 of the feed nut which causes the carriage 62 to travel to the left in Figure 1 disengaging the speed changing gear 13 from the gear 8 and into mesh with the high speed gear 12 thereby establishing a direct drive between the drive and driven shafts of the transmission or, in other words, high gear or speed to the transmission. It is to be understood that during the movement of the speed changing gear from the gear 8 to the gear 12 that the clutch is disengaged and engages after the speed changing gear 13 meshes with the high speed gear 12. The vehicle now operating in high gear, the contact 132 of the contact member 120 is positioned in engagement with the left hand end button 115 of the contact member 112 so that should the vehicle decrease in speed, the governor will act to move the contact member 121 in a reverse direction, bringing the contact 127 in engagement with the contact 132 energizing the solenoid 138 and as the latter is energized it attracts the armature 144 closing the auxiliary ground to the electric circuit. The energization of the solenoid 138 causes a reverse sliding movement of the solenoid rod 140 so that the dog 149 thereof turns the contact member 112 in a clockwise direction and as said contact member 112 moves in this direction the control hub 84 is correspondingly turned and the latter in turn actuates the element 91 so that the lug 101 thereof will be disengaged from the notch I and restored to the notch H. As the lug 101 moves into the notch H through the element 90 the control shell is restored to a position to bring about intermediate gear. Should the governor decrease further in speed the contact elements 121 and 120 are moved to engage the second contact button 115 with the contact element 132. The solenoid 138 will thereby be energized imparting a further clockwise movement to the contact element 112 through the sliding movement of the solenoid rod 140 and the dog 149 engaging the intermediate tooth 116 of the element 112 which brings about turning of the control hub 84 in a clockwise direction to disengage the lug 101 of the element 91 from the notch H and restore it to the notch G. This last-named movement of the element 91 imparts a corresponding movement to the element 90 positioning the control shell so that the speed changing gear 13 will be moved out of mesh with the gear 8 and return to neutral position and the speed changing gear 14 moved into mesh with the gear 9 reestablishing the transmission into low gear. Should there be a further decrease in speed of the motor vehicle the governor again acts on the contact elements 121 and 120 to engage the last of the contact buttons 115 of the member 112 with the contact element 132, this will again complete the circuit and energize the solenoid 138, again causing the solenoid 140 and the dog 149 to turn the elements 112 in a clockwise direction. This latter-named movement of the contact member 112 again turns the control hub in a clockwise direction which brings about operation of the element 91 to disengage the lug 101 from the notch G and restore it to the notch F. The latter-named movement of the element 91 moves the element 90 therewith to position the shell so that the latter will bring about operation of the carriage 63 to disengage the speed changing gear 14 from the gear 9 and restore said speed changing gear to a neutral position.

It should be understood that the function of the elements 120 and 121 with their contact elements 126, 131, 127 and 132 operating in connection with the buttons 114 and 115 of the element 112 and through the contacts 111 to the solenoids is to effect a temporary electric circuit and thereby energize either the one or the other of said solenoids until it attracts its armature to complete the secondary circuit. It should be further understood that the influence of the solenoid acting upon the element 112 immediately breaks the first or primary circuit, leaving the second or secondary circuit through the armature complete until the stroke of the solenoid rod 140 has been completed whereupon said rod abuts the armature of the energized solenoid and breaks the secondary circuit, whereupon the solenoid rod 140 through the action of the springs 141 is returned to its normal position.

Should at any time during the operation of the vehicle it be desired to bring about disengagement of the clutch, the hand control 153 is operated so that the cam 156 will place a drag on the stop wheel sufficient to bring about a temporary stoppage or a temporary reduction in the speed of rotation of the feed nut as compared with the shaft 35 and thereby cause the shaft 35 to slide endwise to disengage the clutch.

Having described the invention, I claim:

1. In combination with a variable speed transmission having speed change gearing and a control means having a step by step movement into several positions for selectively operating said speed change gearing, a housing secured to said transmission, a control hub journaled in said housing, an actuating means connected to said hub, a retaining member secured to said housing and having a series of notches, one for each position of the control means, a latch element journaled on the hub, means connecting the control means to the latch element for imparting movement to said control means from said latch element, a second latch element slidably secured to the first latch element, a lug on the second latch element to move into and out of the notches, said first latch element having an opening to receive the lug to establish a drive connection between said latch elements, and means for imparting sliding and swinging movement to the second latch element by the rotation of the control hub.

2. In combination with a variable speed transmission having a speed change gearing and a control means having a step by step movement into several positions for selectively operating said speed change gearing, a housing secured to said transmission, a control hub journaled in said housing, an actuating means connected to said hub, a retaining member secured to said housing and having a series of notches, one for each position of the control means, a latch element journaled on the hub, means connecting the control means to the latch element for imparting movement to said control means from said latch element, a second latch element slidably secured to the first latch element, a lug on the second latch member to move into and out of the notches, said first latch element having an opening to receive the lug to establish a drive connection between said latch elements, spring means between the latch elements normally acting to urge the second latch element into a position for bringing the lug into any one of the notches, and means establishing a drive between the control hub and the second latch element.

3. In combination with a variable speed transmission having speed change gearing and a control means having a step by step movement into several positions for selectively operating said speed change gearing, a housing secured to said transmission, a control hub journaled in said housing, an actuating means connected to said hub, a retaining member secured to said housing and having a series of notches, one for each position of the control means, a latch element journaled on the hub, means connecting the control means to the latch element for imparting movement to said control means from said latch element, a second latch element slidably secured to the first latch element, a lug on the second latch element to move into and out of the notches, said first latch element having an opening to receive the lug to establish a drive connection between said latch elements, spring means between the latch elements normally acting to urge the second latch element into a position for bringing the lug into any one of the notches, a pair of lugs formed on said second latch element, a pair of shoulders formed on the control hub to alternatingly abut said lugs to impart sliding movement to said second latch element for moving the first lug into and out of the notches, and a spring drive means between the control hub and the second latch element.

4. In combination with a variable speed transmission having speed change gearing and a control means having a step by step movement into several positions for selectively operating said speed change gearing, a housing secured to said transmission, a control hub journaled in said housing, an actuating means connected to said hub, a retaining member secured to said housing and having a series of notches, one for each position of the control means, a latch element journaled on the hub, means connecting the control means to the latch element for imparting movement to said control means from said latch element, a second latch element slidably secured to the first latch element, a lug on the second latch element to move into and out of the notches, said first latch element having an opening to receive the lug to establish a drive connection between said latch elements, spring means between the latch elements normally acting to urge the second latch element into a position for bringing the lug into any one of the notches, a pair of lugs formed on said second latch element, a pair of shoulders formed on the control hub to alternatingly abut said lugs to impart sliding movement to said second latch element for moving the first lug into and out of the notches, an arm secured to the control hub and having an opening, a curved rod secured to the first latch element and extending through the opening of the arm, coil springs mounted on said curved rod and bearing against opposite sides of the arm and against opposite sides of the second latch element to impart movement thereto when the lug thereof is disengaged from any one of the notches.

5. In combination with a variable speed transmission having speed change gearing and a control means having a step by step movement into several positions for selectively operating said speed change gearing, a housing secured to said transmission, a hand controlled hub journaled in said housing, a hand actuated means connected to said hub, a retaining member secured to said housing and having a series of notches, one for each position of the control means, a latch element journaled on the hub, means connecting the control means to the latch element for imparting movement to said control means from said latch element, a second latch element slidably secured to the first latch element, a lug on the second latch element to move into and out of the notches, said first latch element having an opening to receive the lug to establish a drive connection between said latch elements, spring means between the latch elements normally acting to urge the second latch element into a position for bringing the lug into any one of the notches, a pair of lugs formed on said second latch element, a pair of shoulders formed on the control hub to alternatingly abut said lugs to impart sliding movement to said second latch element for moving the first lug into and out of the notches, an arm secured to the control hub and having an opening, a curved rod secured to the first latch element and extending through the opening of the arm, coil springs mounted on said curved rod and bearing against opposite sides of the arm and against opposite sides of the second latch element to impart movement thereto when the lug thereof is disengaged from any one of the notches, electrical means for imparting movement to the control hub to actuate the control means for obtaining certain speeds to the transmission, and a governor driven by said transmission for actuating said electrical means.

6. In combination with a variable speed transmission having speed change gearing and a control means having a step by step movement into several positions for selectively operating said speed change gearing, a housing secured to said transmission, a hand control hub journaled in said housing, a hand actuated means connected to said hub, a retaining member secured to said housing and having a series of notches, one for each position of the control means, a latch element journaled on the hub, means connecting the control means to the latch element for imparting movement to said control means from said latch element, a second latch element slidably secured to the first latch element, a lug on the second latch element to move into and out of the notches, said first latch element having an opening to receive the lug to establish a drive connection between said latch elements, spring means between the latch elements normally acting to urge the second latch element into a position for bringing the lug into any one of the notches, a pair of lugs formed on said second latch element, a pair of shoulders formed on the control hub to alternatingly abut said lugs to impart sliding movement to said second latch element for moving the first lug into and out of the notches, an arm secured to the control hub and having an opening, a curved rod secured to the first latch element and extending through the opening of the arm, coil springs mounted on said curved rod and bearing against opposite sides of the arm and against opposite sides of the second latch element to impart movement thereto when the lug thereof is disengaged from any one of the notches, an electric switch mounted on said hub, an electric circuit connected to said switch and including an electrical source, a governor driven by the transmission for actuating said switch, and electrical means connected to said circuit and to said control hub for imparting movement to the latter.

7. In combination with a variable speed transmission having speed change gearing and a control means having a step by step movement into several positions for selectively operating said speed change gearing, a housing secured to said transmission, a hand controlled hub journaled in said housing, a hand actuated means connected to said hub, a retaining member secured to said housing and having a series of notches, one for each position of the control means, a latch element journaled on the hub, means connecting the control means to the latch element for imparting movement to said control means from said latch element, a second latch element slidably secured to the first latch element, a lug on the second latch element to move into and out of the notches, said first latch element having an opening to receive the lug to establish a drive connection between said latch elements, spring means between the latch elements normally acting to urge the second latch element into a position for bringing the lug into any one of the notches, a pair of lugs formed on said second latch element, a pair of shoulders formed on the control hub to alternatingly abut said lugs to impart sliding movement to said second latch element for moving the first lug into and out of the notches, an arm secured to the control hub and having an opening, a curved rod secured to the first latch element and extending through the opening of the arm, coil springs mounted on said curved rod and bearing against opposite sides of the arm and against opposite sides of the second latch element to impart movement thereto when the lug thereof is disengaged from any one of the notches, electrical means for imparting movement to the control hub to actuate the control means for obtaining certain speeds to the transmission, a governor driven by said transmission for actuating said electrical means, an electrical drive means connected to the hub for imparting movement to the latter in either direction, an electric circuit connected to said electrical drive means and including an electrical source, a switch for controlling the circuit, and a governor driven by the transmission for actuating the switch.

8. In combination with a variable speed transmission having speed change gearing and a control means having a step by step movement into several positions for selectively operating said speed change gearing, a housing secured to said transmission, a hand controlled hub journaled in said housing, a hand actuated means connected to said hub, a retaining member secured to said housing and having a series of notches, one for each position of the control means, a latch element journaled on the hub, means connecting the control means to the latch element for imparting movement to said control means from said latch element, a second latch element slidably secured to the first latch element, a lug on the second latch element to move into and out of the notches, said first latch element having an opening to receive the lug to establish a drive connection between said latch elements, spring means between the latch elements normally acting to urge the second latch element into a position for bringing the lug into any one of the notches, a pair of lugs formed on said second latch element, a pair of shoulders formed on the control hub to alternatingly abut said lugs to impart sliding movement to said second latch element for moving the first lug into and out of the notches, an arm secured to the control hub and having an opening, a curved rod secured to the first latch element and extending through the opening of the arm, coil springs mounted on said curved rod and bearing against opposite sides of the arm and against opposite sides of the second latch element to impart movement thereto when the lug thereof is disengaged from any one of the notches, a toothed member keyed to the control hub, a ratchet means for imparting movement to said toothed member in either direction, electrical means for operating said ratchet means, an electric circuit connected to said electrical means and including an electrical source, a control switch for opening and closing the circuit, and a governor driven by the transmission and connected to the switch to effect operation thereof at varying speeds of the transmission.

9. In combination with a variable speed transmission having speed change gearing and a control means for selectively operating said speed change gearing, an actuating means connected to said control means for actuating the latter and including a control hub mounted for rotation in either direction, electrical means for imparting movement to the control hub, and a governor driven by the transmission and connected to and actuating said electrical means to automatically obtain variable speeds to the transmission.

10. In combination with a variable speed transmission having speed change gearing and a control means for selectively operating said speed change gearing, an actuating means connected to said control means for actuating the latter and including a control hub mounted for rotation in either direction, electrical means for imparting movement to the control hub, a governor driven by the transmission and connected to and actuating said electrical means to automatically obtain certain speeds to the transmission, and means connected to the control hub whereby the latter may be manually actuated.

11. In combination with a variable speed transmission having speed change gearing and a control means for selectively operating said speed change gearing, an actuating means connected to said control means for actuating the latter and including a control hub mounted for rotation in either direction, an electric switch mounted on said hub, an electric circuit connected to said switch and including an electric source, a governor driven by the transmission for actuating said switch, electrical means connected to said circuit and to said control hub for imparting movement to the latter, and means connected to the hub whereby the latter may be manually actuated.

12. A transmission comprising a housing, a transmission mechanism mounted in said housing and including speed change gearing and a self-engaging clutch for connecting and disconnecting the transmission mechanism to a power source, a shaft rotatably and slidably mounted in the housing, means for rotating said shaft by the power source and permitting said shaft to have endwise sliding movement in either direction, a feed nut having right and left hand feed threads journaled in the housing, a drive means between said shaft and the feed nut, a control shell journaled in the housing and having several positions, means for moving said shell into said position, carriages slidably supported to said housing, dogs movably mounted on said carriages to be engaged with and disengaged from the feed threads of the feed nut, means connecting the carriages to said speed change gearing, means between said control shell and the dogs to selectively engage and disengage the dogs with the feed threads of the nut in accordance with the position occupied by said shell, and means under the control of said carriages to retain the feed nut against rotation for a limited period of time to cause said nut to slide the shaft for disengaging the clutch prior to the carriages moving the speed change gearing into and out of mesh and adapted to permit the clutch to engage after the meshing of the speed change gearing.

13. A transmission comprising a housing, a transmission mechanism mounted in said housing and including speed change gearing and a self-engaging clutch for connecting and disconnecting the transmission mechanism to a power source, a shaft rotatably and slidably mounted in the housing, means for rotating said shaft by the power source and permitting said shaft to have endwise sliding movement, a feed nut of tubular formation journaled in the housing and surrounding said shaft and having right and left hand feed threads formed on the exterior thereof, a drive means between the shaft and the feed nut, a control shell journaled in the housing and having several positions and surrounding the feed nut, carriages slidably supported to said housing and located between the control shell and the feed nut, means connecting said carriages to the speed change gearing, dogs movably mounted to said carriages to be engaged with and disengaged from the feed threads of the nut, means between said control shell and the dogs for selectively engaging and disengaging the dogs with the feed threads of the nut in accordance with the positions occupied by said control shell, and means under the control of said carriages to retain the feed nut against rotation for a limited period of time to cause said nut to bring about sliding of the shaft for disengaging the clutch prior to the carriages moving the speed change gearing into and out of mesh and adapted to permit the clutch to engage after the meshing of the speed change gearing.

14. A transmission comprising a housing, a transmission mechanism mounted in said housing and including speed change gearing and a self-engaging clutch for connecting and disconnecting the transmission mechanism to a power source, a shaft rotatably and slidably mounted in the housing, means for rotating said shaft by the power source and permitting said shaft to have endwise sliding movement, a feed nut having right and left hand feed threads journaled in the housing and of tubular formation and surrounding said shaft, a worm drive between the shaft and the nut, a control shell journaled in the housing and surrounding the feed nut and spaced therefrom and capable of having several positions, carriages slidably supported in said housing and located between the control shell and the nut, dogs movably mounted on said carriages to be engaged and disengaged from the feed threads of the feed nut, means connecting the carriages to said speed change gearing, means between said control shell and the dogs for selectively engaging and disengaging the dogs with the feed threads of the nut in accordance with the positions occupied by said control shell, and means under the control of said carriages to retain the feed nut against rotation for a limited period of time to cause said nut to slide the shaft for disengaging the clutch prior to the carriages moving the speed change gearing into and out of mesh and adapted to permit the clutch to engage after the meshing of the speed change gearing.

15. A transmission comprising a housing, a transmission mechanism mounted in said housing and including speed change gearing and a self-engaging clutch for connecting and disconnecting the transmission mechanism to a power source, a shaft rotatably and slidably mounted in the housing, means for rotating said shaft by the power source and permitting said shaft to have endwise sliding movement, a feed nut having right and left hand feed threads journaled in the housing and of tubular formation and surrounding said shaft, a worm drive between the shaft and the nut, a control shell journaled in the housing and surrounding the feed nut and spaced therefrom and capable of having several positions, carriages slidably supported in said housing and located between the control shell and the nut, arms pivotally mounted to the carriages, dogs carried by said arms, spring means acting on said arms to normally disengage the dogs from the feed threads of the nut, means connecting the carriages to said speed change gearing, means between said control shell and the dogs for selectively engaging and disengaging the dogs with the feed threads of the nut in accordance with the positions occupied by said control shell, and means under the control of said carriages to retain the feed nut against rotation for a limited period of time to cause said nut to bring about sliding of the shaft for disengaging the clutch prior to the carriages moving the speed change gearing into and out of mesh and adapted to permit the clutch to engage after the meshing of the speed change gearing.

16. A transmission comprising a housing, a transmission mechanism mounted in said housing and including speed change gearing and a self-engaging clutch for connecting and disconnecting the transmission mechanism to a power source, a shaft rotatably and slidably mounted in the housing, means for rotating said shaft by the power source and permitting said shaft to have endwise sliding movement, a feed nut having right and left hand feed threads journaled in the housing and of tubular formation and surrounding said shaft, a worm drive between the shaft and the nut, a control shell journaled in the housing and surrounding the feed nut and spaced therefrom and capable of having several positions, carriages slidably supported in said housing and located between the control shell and the nut, arms pivotally mounted to the carriages, dogs carried by said arms, spring means acting on said arms to normally disengage the dogs from the feed threads of the nut, adjustable rollers carried by the dogs, means connecting the carriages to said speed change gearing, means between said control shell and the rollers of said dogs for selectively engaging and disengaging the dogs with the feed threads of the nut in accordance with the positions occupied by said control shell, and means under the control of said carriages to retain the feed nut against rotation for a limited period of time to bring about sliding of the shaft for disengaging the clutch prior to the carriages moving the speed change gearing into and out of mesh and adapted to permit the clutch to engage after the meshing of the speed change gearing.

17. A transmission comprising a housing, a transmission mechanism mounted in said housing and including speed change gearing and a self-engaging clutch for connecting and disconnecting the transmission mechanism to a power source, a shaft rotatably and slidably mounted in the housing, means for rotating said shaft by the power source and permitting said shaft to have endwise sliding movement, a feed nut having right and left hand feed threads journaled in the housing and of tubular formation and surrounding said shaft, a worm drive between the shaft and the nut, a control shell journaled in the housing and surrounding the feed nut and spaced therefrom and capable of having several positions, carriages slidably supported in said housing and located between the control shell and the nut, arms pivotally mounted to the carriages, dogs carried by said arms, spring means acting on said arms to normally disengage the dogs from the feed threads of the nut, adjustable rollers carried by the dogs, means yieldably connecting the carriages to said speed change gearing for permitting said carriages to have a limited movement prior to disengaging the speed change gearing, means between said control shell and the rollers of the dogs for selectively engaging and disengaging the dogs with the feed threads of the nut in accordance with the positions occupied by said control shell, and means under the control of said carriages to retain the feed nut against rotation for a limited distance of sliding movement of said carriages to cause said nut to slide the shaft to disengage the clutch prior to said carriages moving the speed change gearing into and out of mesh and adapted to permit the clutch to engage after the meshing of the speed change gearing.

18. A transmission comprising a housing, a transmission mechanism mounted in said housing and including speed change gearing and a self-engaging clutch for connecting and disconnecting the transmission mechanism to a power source, a shaft rotatably and slidably mounted in the housing, means for rotating said shaft by the power source and permitting said shaft to have endwise sliding movement, a feed nut having right and left hand feed threads journaled in the housing and of tubular formation and surrounding said shaft, a worm drive between the shaft and the nut, a control shell journaled in the housing and surrounding the feed nut and spaced therefrom and capable of having several positions, carriages slidably supported in said housing and located between the control shell and the nut, arms pivotally mounted to the carriages, dogs carried by said arms, spring means acting on said arms to normally disengage the dogs from the feed threads of the nut, adjustable rollers carried by the dogs, means yieldably connecting the carriages to said speed change gearing for permitting said carriages to have a limited movement prior to disengaging the speed change gearing, cam mechanism carried by said shell to engage the rollers of the dogs for selectively engaging and disengaging the dogs with the feed threads of the nut in accordance with the positions occupied by said control shell, and means under the control of said carriages to retain the feed nut against rotation during each initial sliding movement of said carriages to cause said nut to bring about sliding of the shaft for disengaging the clutch prior to the carriages moving the speed change gearing into and out of mesh and adapted to permit the clutch to engage after the meshing of the speed change gearing.

19. A transmission comprising a housing, a transmission mechanism mounted in said housing and including speed change gearing and a self-engaging clutch for connecting and disconnecting the transmission mechanism to a power source, a shaft rotatably and slidably mounted in the housing, means for rotating said shaft by the power source and permitting said shaft to have endwise sliding movement, a feed nut having right and left hand feed threads journaled in the housing and of tubular formation and surrounding said shaft, a worm drive between the shaft and the nut, a control shell journaled in the housing and surrounding the feed nut and spaced therefrom and capable of having several positions, carriages slidably supported in said housing and located between the control shell and the nut, arms pivotally mounted to the carriages, dogs carried by said arms, spring means acting on said arms to normally disengage the dogs from the feed threads of the nut, adjustable rollers carried by the dogs, means yieldably connecting the carriages to said speed change gearing for permitting said carriages to have a limited movement prior to disengaging the speed change gearing, cam mechanism carried by said shell to engage the rollers of the dogs for selectively engaging and disengaging the dogs with the feed threads of the nut in accordance with the positions occupied by said control shell, a stop for limiting the sliding movement of the shaft after the disengagement of the clutch, and a stop wheel secured to the nut and including a frictional clutch and cooperating with the carriage to bring about stopping of the rotation of the nut during each initial sliding movement of the carriage so as to cause the nut to bring about sliding movement of the shaft for the disengagement of the clutch prior to the carriages moving the speed change gearing into and out of mesh and adapted to permit the clutch to engage after the meshing of the speed change gearing.

20. A transmission comprising a housing, a transmission mechanism mounted in said housing and including speed change gearing and a self-engaging clutch for connecting and disconnecting the transmission mechanism to a power source, a shaft rotatably and slidably mounted in the housing, means for rotating said shaft by the power source and permitting said shaft to have endwise sliding movement, a feed nut having right and left hand feed threads journaled in the housing and of tubular formation and surrounding said shaft, a worm drive between the shaft and the nut, a control shell journaled in the housing and surrounding the feed nut and spaced therefrom and capable of having several positions, carriages slidably supported in said housing and located between the control shell and the nut, arms pivotally mounted to the carriages, dogs carried by said arms, spring means acting on said arms to normally disengage the dogs from the feed threads of the nut, adjustable rollers carried by the dogs, means yieldably connecting the carriages to said speed change gearing for permitting said carriages to have a limited movement prior to disengaging the speed change gearing, cam mechanism carried by said shell to engage the rollers of the dogs for selectively engaging and disengaging the dogs with the feed threads of the nut in accordance with the positions occupied by said control shell, a stop for limiting the sliding movement of the shaft after the disengagement of the clutch, said carriages having spaced notches, and a stop wheel including a frictional clutch and relatively spaced teeth, said teeth cooperating with the notches and walls of the carriages for restraining the nut against rotation during each initial sliding movement of the carriages so that said nut will bring about sliding movement of the shaft to disengage the clutch prior to the carriages moving the speed change gearing into and out of mesh and said notches adapted to permit free rotation of the stop wheel and the nut to permit the nut to rotate with the shaft and permit the latter to be slid by the engagement of the clutch after the meshing of the speed change gearing.

21. A transmission comprising a housing, a transmission mechanism mounted in said housing and including speed change gearing and a self-engaging clutch for connecting and disconnecting the transmission mechanism to a power source, a shaft rotatably and slidably mounted in the housing, means for rotating said shaft by the power source and permitting said shaft to have endwise sliding movement, a feed nut having right and left hand feed threads journaled in the housing and of tubular formation and surrounding said shaft, a worm drive between the shaft and the nut, a control shell journaled in the housing and surrounding the feed nut and spaced therefrom and capable of having several positions, carriages slidably supported in said housing and located between the control shell and the nut, arms pivotally mounted to the carriages, dogs carried by said arms, spring means acting on said arms to normally disengage the dogs from the feed threads of the nut, adjustable rollers carried by the dogs, means yieldably connecting the carriages to said speed change gearing for permitting said carriages to have a limited movement prior to disengaging the speed change gearing, cam mechanism carried by said shell to engage the rollers of the dogs for selectively engaging and disengaging the dogs with the feed threads of the nut in accordance with the positions occupied by said control shell, a stop for limiting the sliding movement of the shaft after the disengagement of the clutch, said carriages having spaced notches, a stop wheel including a frictional clutch and relatively spaced teeth, said teeth cooperating with the notches and walls of the carriages for restraining the nut against rotation during each initial sliding movement of the carriages so that said nut will bring about sliding movement of the shaft to disengage the clutch prior to the carriages moving the speed change gearing into and out of mesh and said notches adapted to permit free rotation of the stop wheel and the nut to permit the nut to rotate with the shaft and permit the latter to be slid by the engagement of the clutch after the meshing of the speed change gearing, and a dash pot for checking the movement of the shaft in the last-named direction under the influence of the clutch when the latter moves into engaging position.

22. A transmission comprising a housing, a transmission mechanism mounted in said housing and including speed change gearing and a self-engaging clutch for connecting and disconnecting the transmission mechanism to a power source, a shaft rotatably and slidably mounted in the housing, means for rotating said shaft by the power source and permitting said shaft to have endwise sliding movement, a feed nut having right and left hand feed threads journaled in the housing and of tubular formation and surrounding said shaft, a worm drive between the shaft and the nut, a control shell journaled in the housing and surrounding the feed nut and spaced therefrom and capable of having several positions, carriages slidably supported in said housing and located between the control shell and the nut, arms pivotally mounted on the carriages, dogs carried by said arms, spring means acting on said arms to normally disengage the dogs from the feed threads of the nut, adjustable rollers carried by the dogs, means yieldably connecting the carriages to said speed change gearing for permitting said carriages to have a limited movement prior to disengaging the speed change gearing, cam mechanism carried by said shell to engage the rollers of the dogs for selectively engaging and disengaging the dogs with the feed threads of the nut in accordance with the positions occupied by said control shell, a stop for limiting the sliding movement of the shaft after the disengagement of the clutch, said carriages having spaced notches, a stop wheel including a frictional clutch and relatively spaced teeth, said teeth cooperating with the notches and walls of the carriages for restraining the nut against rotation during each initial sliding movement of the carriages so that said nut will bring about sliding movement of the shaft to disengage the clutch prior to the carriages moving the speed change gearing into and out of mesh and said notches adapted to permit free rotation of the stop wheel and the nut to permit the nut to rotate with the shaft and permit the latter to be slid by the engagement of the clutch after the meshing of the speed change gearing, a dash pot for checking the movement of the shaft in the last-named direction under the influence of the clutch when the latter moves into engaging position, and a spring connected to the nut and to the shaft to be tensioned by the sliding movement of the shaft to disengage the clutch and adapted to aid said clutch in sliding the shaft during the engagement of the clutch.

23. A transmission comprising a housing, a transmission mechanism mounted in said housing and including speed change gearing and a self-engaging clutch for connecting and disconnecting the transmission mechanism to a power source, a shaft rotatably and slidably mounted in the housing, a power takeoff pulley driven by the power source, a second pulley splined to the shaft, a drive mechanism connecting said pulleys, means connecting said shaft to the clutch to permit disengagement of the latter by the sliding movement of said shaft, a feed nut having right and left hand feed threads journaled in the housing, a drive means between said shaft and feed nut, a control shell journaled in the housing and having several positions, means for actuating said control shell into said positions, carriages slidably supported in said housing, dogs movably mounted on said carriages to be engaged with and disengaged from the feed threads of the feed nut, means connecting the carriages to said speed change gearing, means between said control shell and the dogs to selectively engage and disengage the dogs with the feed threads of the nut in accordance with the positions occupied by said control shell, and means under the control of said carriages to restrain the feed nut against rotation for a limited period of time to cause said nut to slide the shaft for disengaging the clutch prior to said carriages moving the speed change gearing into and out of mesh and adapted to permit the clutch to engage after the meshing of the speed change gearing.

24. A transmission comprising a housing, a transmission mechanism mounted in said housing and including speed change gearing and a self-engaging clutch for connecting and disconnecting the transmission mechanism to a power source, a shaft rotatably and slidably mounted in the housing, a power takeoff pulley driven by the power shaft, a second pulley splined to the shaft, an arm having one end pivotally and adjustably secured to the housing, spring means supporting the other end of said arm for urging the latter in the direction of said pulleys, a stub shaft journaled to said arm and located adjacent the yieldably supported end of the arm, pulleys secured to said stub shaft and contacting the first and second named pulleys to establish a frictional drive therebetween and capable of adjustment to compensate for wear between said pulleys, a lever pivoted to the housing and abutting the end of the slidable and rotatable shaft, a second lever contacting the first lever and journaled in said housing, means connecting the second lever to the clutch, a feed nut having right and left hand feed threads journaled in said housing, a drive means between said shaft and the feed nut, a control shell journaled in the housing and having several positions, means for moving said control shell into said positions, carriages slidably supported in said housing, dogs movably mounted on said carriages to be engaged with and disengaged from the feed threads of the nut, means connecting the carriages to said speed change gearing, means between said control shell and the dogs to selectively engage and disengage said dogs with the feed threads of the nut in accordance with the positions occupied by said control shell, and means under the control of said carriages to restrain the feed nut against rotation for a limited period of time to cause said nut to slide the shaft for disengaging the clutch prior to the carriages moving the speed change gearing into and out of mesh and adapted to permit the clutch to engage after the meshing of the speed change gearing.

25. A transmission comprising a housing, a transmission mechanism mounted in said housing and including speed change gearing and a self-engaging clutch for connecting and disconnecting the transmission mechanism to a power source, a shaft rotatably and slidably mounted in the housing, means for rotating said shaft by the power source and permitting said shaft to have endwise sliding movement, a feed nut having right and left hand feed threads journaled in the housing and of tubular formation and surrounding said shaft, a worm drive between the shaft and the nut, a control shell journaled in the housing and surrounding the feed nut and spaced therefrom and capable of having several positions, carriages slidably supported in said housing and located between the control shell and the nut, arms pivotally mounted to the carriages, dogs carried by said arms, spring means acting on said arms to normally disengage the dogs from the feed threads of the nut, adjustable rollers carried by the dogs, means yieldably connecting the carriages to said speed change gearing for permitting said carriages to have a limited movement prior to disengaging the speed change gearing, cam mechanism carried by said shell to engage the rollers of the dogs for selectively engaging and disengaging the dogs with the feed threads of the nut in accordance with the positions occupied by said control shell, a stop for limiting the sliding movement of the shaft after the disengagement of the clutch, a stop wheel secured to the nut and including a frictional clutch and cooperating with the carriage to bring about stopping of the rotation of the nut during each initial sliding movement of the carriage so as to cause the nut to bring about sliding movement of the shaft for the disengagement of the clutch prior to the carriages moving the speed change gearing into and out of mesh and adapted to permit the clutch to engage after the meshing of the speed change gearing, and manually operated means for engaging with the stop wheel to retard the feed nut and thereby bring about endwise movement of the shaft to disengage the first-named clutch.

GEORGE L. BROWN.